Dec. 24, 1957  J. KURSHAN  2,817,804
REGULATED INVERTER
Filed Aug. 31, 1954  2 Sheets-Sheet 1
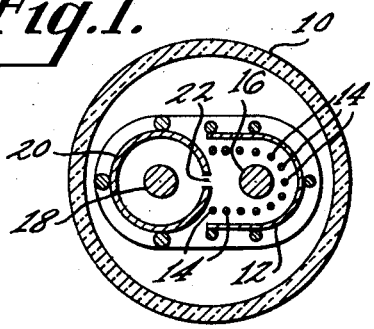
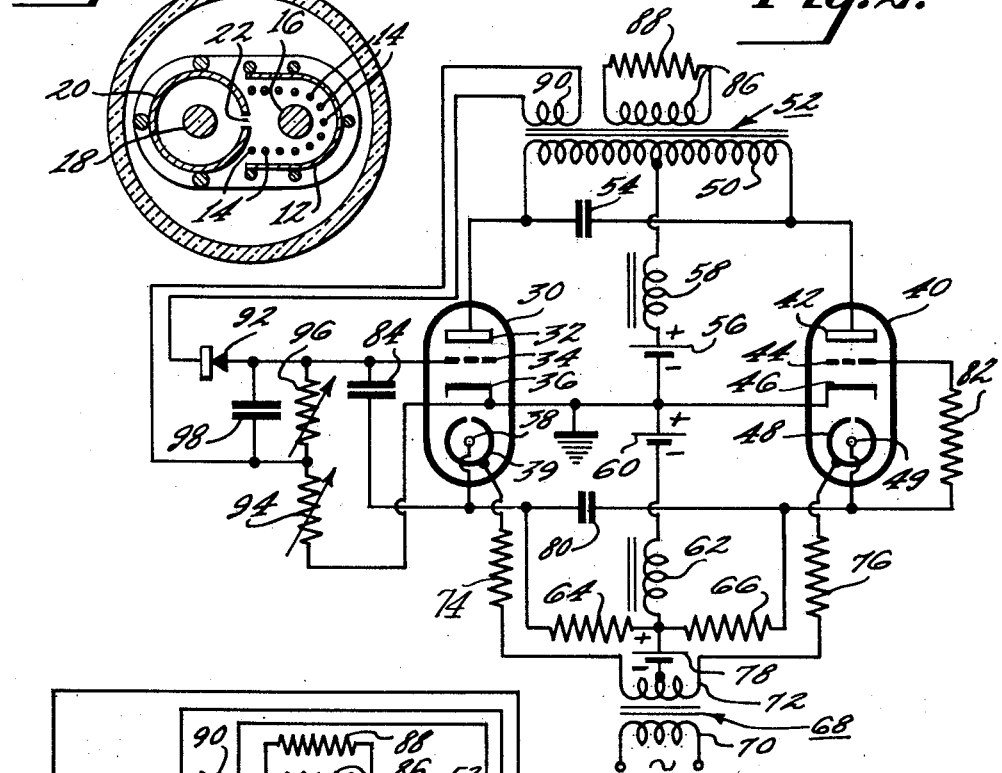
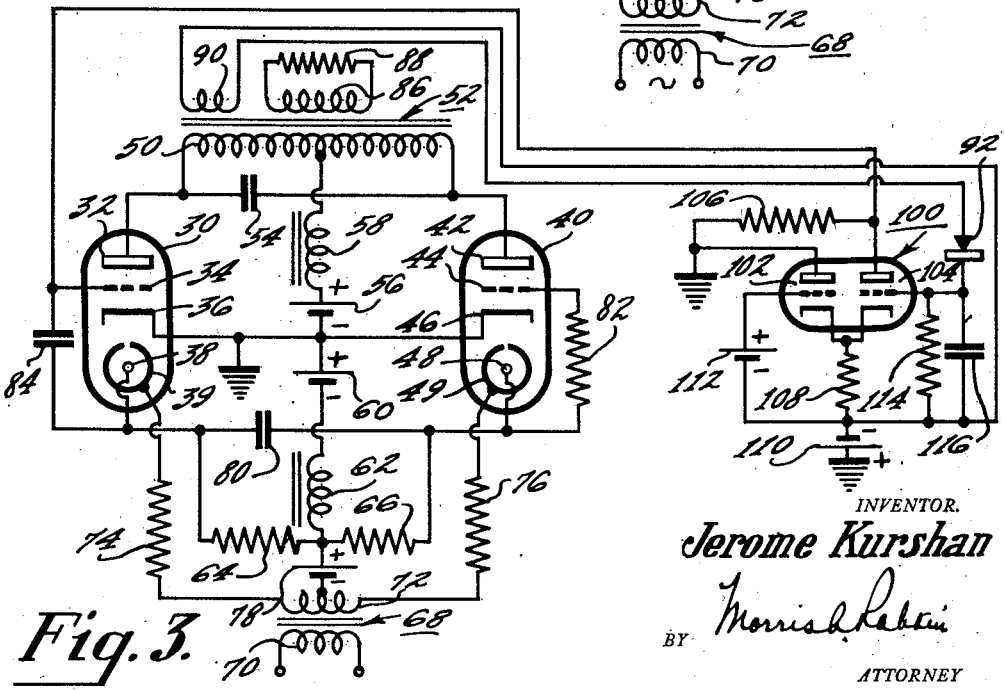
INVENTOR.
Jerome Kurshan
BY Morris ~~
ATTORNEY INVENTOR.
Jerome Kurshan
BY
ATTORNEY United States Patent Office 2,817,804
Patented Dec. 24, 1957

2,817,804

REGULATED INVERTER

Jerome Kurshan, Princeton, N. J., assignor, by mesne assignments, to the United States of America as represented by the Secretary of the Army Application August 31, 1954, Serial No. 453,351

5 Claims. (Cl. 321—18)

This invention relates generally to regulated inverters of the type used to convert D.-C. electrical energy into A.-C. electrical energy. More particularly, the invention relates to novel regulated inverter circuits employing one or more gas-discharge tubes capable of continuous grid control and modulation. While neither specifically nor exclusively related thereto, the regulated inverter circuits of the present invention are particularly applicable for efficiently converting the relatively low voltages of the D.-C. voltage supplies in automobiles, airplanes and the like into relatively high regulated A.-C. voltages.

It has been proposed to regulate inverter circuits using gas tubes, such as thyratrons, by controlling the time, or phase, of firing the thyratrons. Gas tubes of the conventional thyratron type are not capable of a continuous grid control because the grid electrode becomes ineffective as a modulating electrode after the thyratron is fired. Consequently, regulation of inverter circuits, using gas tubes, by means of grid modulation of the current amplitude through the gas tubes has heretofore not been possible. The present invention teaches a novel way to obtain regulation when gas tubes of a type responsive to grid control are used.

Accordingly, it is a principal object of the present invention to provide an improved regulated inverter circuit wherein regulation is obtained by continuous amplitude control of the grid of a gas type tube.

Another object of the present invention is to provide an improved regulated inverter circuit, employing gas tubes, wherein the output A.-C. voltage may be stabilized to some predetermined fixed value.

A further object of the present invention is to provide an improved regulated inverter circuit, employing gas tubes, that is simple and positive in operation and highly efficient in use.

These and further objects of the present invention are attained in inverter circuits employing gaseous discharge tubes of the type wherein the power-output function and the ionization function are separated. Gaseous discharge tubes of the type described herein are more fully described in a copending application by E. O. Johnson, Serial No. 185,745, filed September 20, 1950, and assigned to the assignee of the present invention. A preferred embodiment of the regulated inverter circuit of the present invention employs a pair of gaseous tubes, each having an anode, a grid, a main cathode, an auxiliary cathode, and garrote or constricting electrode. The pair of gaseous tubes are connected in a parallel-type inverter circuit. A source of unidirectional voltage, to be converted into a source of A.-C. output voltage, is connected in the anode-main cathode circuit of each tube. The anodes of the tubes are coupled to the ends of the primary winding of an output transformer. A second source of unidirectional voltage is connected in the auxiliary cathode-main cathode circuit of each tube for the purpose of ionizing the gas within the tube. A source of A.-C. voltage is applied to an auxiliary cathode-constricting electrode circuit for the purpose of firing the gas tubes alternately, that is, in a cyclical order. The inverter circuit is regulated by rectifying a sample of the A.-C. output voltage and feeding it back degeneratively to the grid of at least one of the gaseous discharge tubes. The feedback circuit, in addition to a rectifier, may comprise a cathode coupled amplifier connected in a manner to stabilize the output A.-C. voltage to some fixed value. The output of the cathode coupled amplifier may be coupled to the grids of the gaseous tubes through a cathode follower circuit if it is desired to reduce the impedance at the grids of the gaseous tubes. Basically, regulation for this type of inverter is accomplished by amplitude control of the grid of at least one of the gaseous tubes in a manner to vary the amplitude of conduction of current therethrough, instead of time, or phase, control of the firing of the gaseous tubes, as in conventional thyratrons.

The novel features of the invention, as well as the invention itself, both as to its organization and method of operation will be understood in detail by the following description when considered in connection with the accompanying drawing, in which similar reference characters refer to similar elements, and in which:

Fig. 1 is a cross-sectional view of a gaseous electron tube used in the regulated inverter, in accordance with the present invention;

Fig. 2 is a schematic diagram of a regulated inverter circuit, in accordance with the present invention;

Fig. 3 is a modification of the regulated inverter circuit, in accordance with the present invention.

Figure 4:
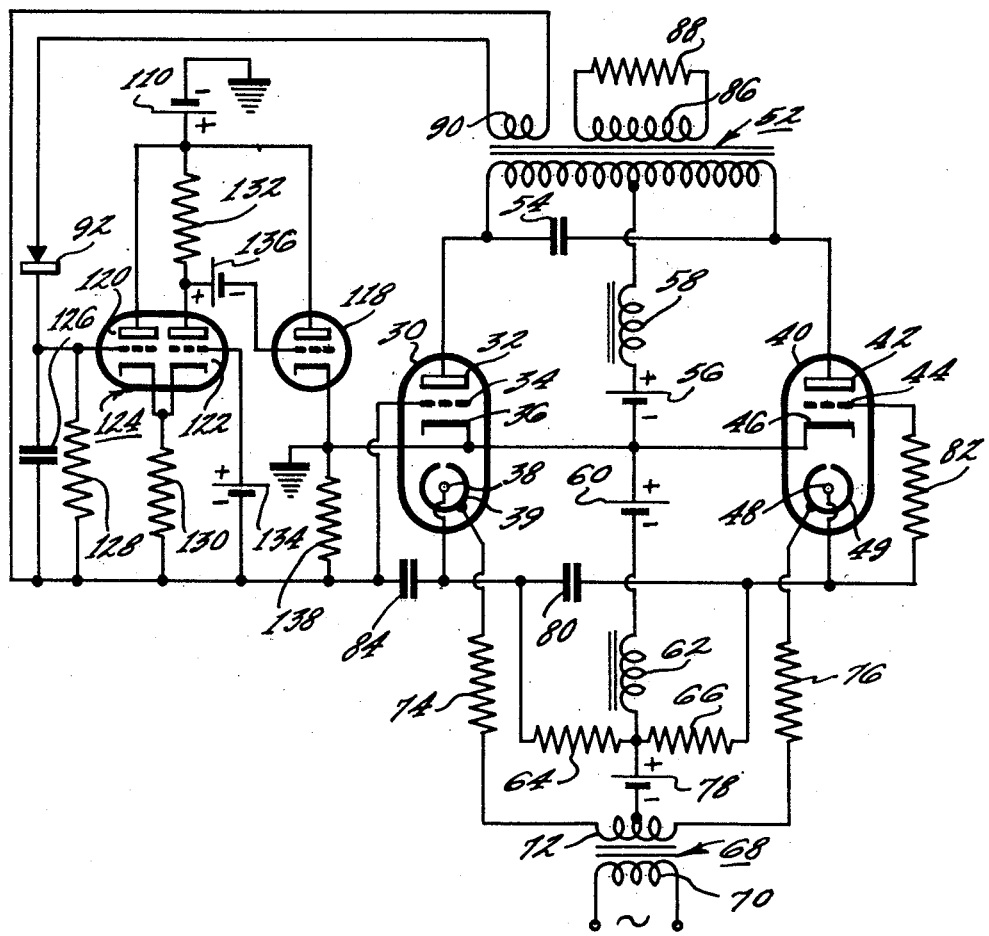
Fig. 4 is another modification of the regulated inverter circuit, in accordance with the present invention.

Referring now to Fig. 1, there is shown a cross-sectional view of a gas tube of the type used in the present invention. A tube envelope 10 contains a U-shaped anode 12, which may be of sheet metal, disposed externally to and in juxtaposed position with a control grid 14 having relatively coarse spacing. A main cathode 16 is maintained within, and partially surrounded by, the control grid 14 and the anode 12. An auxiliary cathode 18, laterally spaced from the cathode 16, is maintained coaxially with respect to a garrote, or constricting electrode 20. An elongated narrow slot 22, in the constricting electrode 20, extends along a plane through the axis of the main and auxiliary cathodes. This structure permits the desired degree of ionization to be obtained between the auxiliary and main cathodes with a considerable minimization of power required to sustain ionization within the tube. The anode 12 and the main cathode 16 of the tube comprise the load circuit through which load currents can be passed in the manner of conventional tubes. These load currents may be controlled by potentials applied to the control grid 14. The envelope 10 is filled with an ionizable gas such as helium. This gaseous electron tube, of Fig. 1, is completely illustrated and described in the aforementioned copending application by E. O. Johnson.

Ionization or breakdown of the gas within the tube of Fig. 1 occurs between the auxiliary cathode 18 and the main cathode 16 and/or the anode 14 of the tube. Thus, there is provided within the gas envelope 10 a plasma that acts as an excellent conductor and that provides a low resistance connection between the anode 12 and the main cathode 16 of the tube. The density of the plasma generated in the tube is controlled, at least in part, by the amount of current flowing through the ionization circuit, that is through the main cathode-auxiliary cathode circuit. Accordingly, the resistance between the main cathode 16 and the anode 12 may be controlled effectively by controlling the current flowing in the ionization circuit. Alternately, the load current in the anode-main cathode circuit, may be controlled by potentials applied to the control grid 14.

Referring now to Fig. 2 there is shown a regulated inverter circuit employing a pair of gaseous tubes 30 and 40, of the type described. Each of the tubes 30 and 40 has, respectively, an anode 32 and 42, a grid 34 and 44, a main cathode 36 and 46, an auxiliary cathode 38 and 48 and a constricting electrode 39 and 49. The anodes 32 and 42 of the tubes 30 and 40 are connected to each other through a center tapped primary winding 50 of an output transformer 52. The anodes 32 and 42 are also connected to each other through a commutating capacitor 54. The main cathodes 36 and 46 of the tubes 30 and 40 are connected to each other and to a common source of reference potential, such as ground. An energy source of unidirectional voltage 56, that is to be converted into an A.-C. voltage, has its negative terminal connected to the main cathodes 36 and 46 of the tubes 30 and 40, and its positive terminal connected to the center tap of the primary winding 50, through a smoothing choke 58. A second source of unidirectional voltage 60 is provided for the auxiliary cathode-main cathode circuit of each of the tubes 30 and 40. The positive terminal of the unidirectional voltage source 60 is connected to the main cathodes 36 and 46 of the tubes 30 and 40; and the negative terminal is connected to the auxiliary cathodes 38 and 48, of the tubes 30 and 40, through a smoothing choke 62 and resistors 64 and 66, respectively.

Means are provided to fire the tubes 30 and 40 alternately and periodically. To this end, there is provided an input transformer 68 having a primary winding 70 adapted to be connected across any convenient and conventional source of alternating voltage (not shown). A center tapped secondary winding 72 of the input transformer 68 has its ends connected to the constricting electrodes 39 and 49 of the tubes 30 and 40, respectively, through current limiting resistors 74 and 76, respectively. The constricting electrodes 39 and 49 of the tubes 30 and 40, are biased negatively with respect to their respective auxiliary cathodes 38 and 48 by means of a source of bias voltage, such as a battery 78. The battery 78 has its positive terminal connected to the junction of the resistors 64 and 66, and its negative terminal connected to the center tap of the secondary winding 72 of the input transformer 68. The auxiliary cathodes 38 and 48, of the tubes 30 and 40, are connected to each other through a commutating capacitor 80. The grid 44 of the tube 40 is connected to the auxiliary cathode 48 through a grid resistor 82; and the grid 34 of the tube 30 is connected to the auxiliary cathode 38 through a decoupling capacitor 84. An A.-C. output voltage is derived across a secondary winding 86 of the output transformer 52 for application to an external load, represented herein as a resistor 88.

The operation of the parallel type inverter circuit, illustrated in Fig. 2, without regulation, will now be described. Let it be assumed that the tube 40 is conducting current through its anode-main cathode circuit and through its auxiliary cathode-main cathode circuit, and the tube 30 is cut off. Let it be assumed, further, that as a result of the alternating current applied to the primary winding 70 of the input transformer 68 a transformed positive-going voltage is applied to the constricting electrode 39 of the tube 30, and a negative-going voltage is applied to the constricting electrode 49 of the tube 40. The tube 30 will be fired as a consequence of the positive-going voltage overcoming the bias of the voltage source 78, and current will flow in the main cathode-auxiliary cathode circuit comprising the cathode 36, the voltage source 60, the choke 62, the resistor 64 and the auxiliary cathode 38. Current will also flow in the anode-main cathode circuit of the tube 30 comprising the anode 32, the primary winding 50, the choke 58, the voltage source 56 and the main cathode 36. As a consequence of the firing of the tube 30 the voltage at the anode 32 and the voltage at the auxiliary cathode 38 will approach the ground potential of the main cathode 36. This drop in voltage with respect to the main cathode 36 is applied to the anode 42 and to the auxiliary cathode 48 of the tube 40 through the commutating capacitors 54 and 80, respectively, thereby extinguishing conduction through tube 40. The tube 30 will conduct current therethrough until the alternating input voltage applied to the primary 70, of the input transformer 68, causes the constricting electrode 39 of the tube 30 to go negative and the constricting electrode 49 of the tube 40 to go positive. This will once more cause current to flow through the tube 40 and extinguish the current flowing through the tube 30.

Since current will flow in opposite directions in each half of the center tapped winding 50, of the output transformer 52, with alternate conduction through the tubes 30 and 40, respectively, an alternating voltage is induced in the secondary winding 86 and applied across the load 88.

Where the impedance of the load, represented by the resistor 88, is variable, the A.-C. voltage thereacross will vary with the variations of the impedance of the load. Consequently, means are provided, in accordance with the present invention, to regulate the A.-C. voltage output across the load 88. To this end a sample of the A.-C. output voltage is derived across a tertiary winding 90 coupled to the primary winding 50 of the output transformer 52. One end of the tertiary winding 90 is connected to the grid 34 of the tube 30 through a rectifier 92. The rectifier 92 may be either an electron tube diode, or a dry type rectifier of the selenium or germanium type. The rectifier 92 is connected in a manner whereby the anode thereof is connected to the grid 34 of the tube 40. Thus conventional current will flow in the direction indicated by the arrow of the rectifier 92. The other end of the tertiary winding 90 is connected to the main cathode 36 through a variable resistor 94. The grid 34 of the tube 30 is also connected in series with the resistor 94 through a variable resistor 96, shunted by a filter capacitor 98. The regulation of the inverter circuit of Fig. 2 will now be described.

Let it be assumed, for example, that the impedance of the load 88 is suddenly increased so that the A.-C. voltage thereacross has a tendency to increase. The increase in the A.-C. output voltage will be sampled by the tertiary winding 90. This sampled A.-C. voltage will be rectified by the rectifier 92 and applied as a negative-going voltage at the grid 34, with respect to the main cathode 36, of the tube 30. Consequently, conduction in the anode-main cathode circuit of the tube 30 will decrease, and the voltage transformed by the secondary 86 of the output transformer 52 will also decrease. Thus, any tendency for the A.-C. output voltage across the load 88 to increase will be offset. It is obvious that any tendency for the A.-C. output voltage across the load 88 to decrease will give rise to a set of reverse conditions whereby this tendency will be offset. The resistors 94 and 96 are shown as variable resistors so that the performance of the inverter may be optimized.

While the regulated inverter circuit of Fig. 2 compensates for variations in the impedance of the load it does not provide means to stabilize the A.-C. output voltage to some fixed, desired value. Such regulated inverter circuits are illustrated in Figs. 3 and 4.

Referring now to Fig. 3, there is shown a regulated inverter circuit that differs from the one of Fig. 2 in the feedback means from the tertiary winding 90 to the grid 34 of the tube 30. Feedback in the regulated inverter, shown in Fig. 3, is accomplished through a cathode coupled amplifier 100 comprising a triode tube 102 and a triode tube 104. The tubes 102 and 104 may be contained within the same envelope as a duo-triode, as illustrated in Fig. 3. The anode of the triode 102 is connected directly to ground; and the anode of the triode 104 is connected to ground through a load resistor 106. The cathodes of the tubes 102 and 104 are connected to each other and to ground through the serially connected circuit comprising a common cathode resistor 108 and a source 110 of anode voltage. A source 112 of fixed voltage has its positive terminal connected to the grid of the tube 102, and its negative terminal connected to the junction of the resistor 108 and the negative terminal of the voltage source 110. A grid resistor 114 and a capacitor 116 are connected in parallel with each other and between the grid of the tube 104 and the junction of the resistor 108 and the voltage source 110.

The operation of the regulated inverter illustrated in Fig. 3 will now be described. The voltage source 112, illustrated herein as a source of fixed voltage, such as a battery, is the fixed voltage against which the output voltage of the inverter circuit is to be compared in order to stabilize the output A.-C. voltage with respect thereto. The source 112 of fixed voltage determines the conduction through the triode tube 102 and thereby fixes the voltage at the cathodes of the tubes 102 and 104. Samples of the A.-C. output voltage are derived by the tertiary winding 90 of the output transformer 52 and applied to the grid of the tube 104 through the rectifier 92. Let it now be assumed, for example, that there is a tendency for the A.-C. output voltage across the load 88 to decrease. A sample of this decreased output voltage is derived by the tertiary winding 90 and applied to the grid of the tube 104 as a negative-going voltage. This negative-going voltage is compared to the voltage source 112 and a positive-going error signal voltage is derived at the anode of the tube 104 and then applied to the grid 34 of the tube 30. The positive-going signal applied to the grid 34 results in a decrease in the impedance of the tube 30, thereby allowing more current to flow from the source 56 of D.-C. voltage through the anode-main cathode circuit of the tube 30, including the primary winding 50 of the output transformer 52. The voltage transformed by the secondary winding 86 of the output transformer 52 will now tend to increase and thereby offset the original tendency of the A.-C. voltage across the load 88 to decrease. In a similar manner any tendency for the A.-C. voltage across the load 88 to increase will be compensated by a reverse set of conditions whereby this tendency will be offset.

Referring now to Fig. 4 there is shown a regulated inverter circuit substantially similar to that illustrated in Fig. 3 except that the coupling between the feedback circuit from the tertiary winding 90 is applied to the grid 34 of the tube 30 through a tube 118 connected as a cathode follower, for reduced impedance across the grid circuit of the tube 30. Referring to Fig. 4 the cathode of the rectifier 92 is connected to the grid of a triode 120. The tube 120 and a triode tube 122 are connected to each other in a cathode coupled amplifier circuit 124. A capacitor 126 and a grid resistor 128 are connected to each other in parallel and between the grid of the tube 120 and the grid 34 of the tube 30. The cathodes of the tubes 120 and 122 are connected to each other and to the grid 34 of the tube 30, through a common cathode resistor 130. The anode of the tube 120 is connected to the positive terminal to the source 110 of anode voltage. The anode of the tube 122 is connected to the positive terminal of the voltage source 110 through an anode load resistor 132. A source 134 of fixed voltage, against which feedback sample voltages are to be compared, has its positive terminal connected to the grid of the tube 122 and its negative terminal connected to the grid 34 of the tube 30. The signals derived at the anode of the tube 122, which may be termed error signals, are applied to the grid of the cathode follower tube 118 through a source 136 of fixed voltage. The voltage source 136 provides the grid of the tube 118 with the proper operating potential with respect to its cathode. The anode of the tube 118 is connected to the positive terminal of the source 110 of anode voltage. The cathode of the tube 118 is connected to ground, and to the grid 34 of the tube 30 through a cathode resistor 138.

The operation of the regulated inverter circuit illustrated in Fig. 4 will now be described. Let it be assumed that there is a tendency for the A.-C. output voltage across the load 88 to increase. A sample of the increased voltage is derived by the tertiary winding 90 of the output transformer 52, and applied to the grid of the tube 120 through the rectifier 92, as a positive-going signal. Conduction will now increase through the tube 120 and raise the voltage at the cathode of the tube 122, as a consequence of increased current flow through the common cathode resistor 130. Since the grid of the tube 122 is maintained at a fixed potential by the source 134 of the fixed voltage, an increase in the cathode potential will cause current to decrease through the tube 122. Consequently, a positive-going error signal is derived at the anode of the tube 122 and applied to the grid of the cathode follower 118 through the voltage source 136. As a consequence of the positive-going signal on the grid of the cathode follower 118, the tube 118 conducts a greater current and the voltage drop across the cathode resistor 138 is increased. Since the resistor 138 is in the grid-cathode circuit of the tube 30, an increase in the voltage across the resistor 138 will cause the grid 34 of the tube 30 to become more negative with respect to the main cathode 36, and thereby increase the impedance of the tube 30. An increase in the impedance of the tube 30 will cause less current to flow in the primary winding 50, of the output transformer 52, and thereby tend to decrease the transformed A.-C. voltage in the secondary winding 86. Thus, the original tendency of the A.-C. voltage across the load 88 to increase is compensated for by an increase in the impedance of the gas tube 30, resulting in a decrease in the transformed voltage across the secondary winding 86 of the output transformer 52.

It will be noted that in the regulated inverter circuits illustrated in Figs. 2, 3 and 4, while only one feedback path is shown from the tertiary winding 90 to the grid 34 of the tube 30, it will be understood that a bias voltage determined by the output A.-C. voltage may also be fed back to the grid 44 of the tube 40 where a greater degree of regulation is desired.

Thus, there has been shown and described herein, in accordance with the objects of the present invention, regulated inverter circuits using gas tubes whereby regulation is obtained by modulating the amplitude of the grid of the gas tube during the conducting phase of this tube. In this respect the regulation of gas tube inverters, as described herein, differs from the system of regulating thyratron inverters by controlling the time and/or phase of the firing of the thyratrons.

What is claimed is:

1. A regulated inverter for converting D.-C. energy into A.-C. energy comprising a gas tube having an anode, a grid, a main cathode, an auxiliary cathode and a constricting electrode surrounding a portion of said auxiliary cathode, means to apply a first source of D.-C. voltage between said anode and said main cathode, means to apply a second source of D.-C. voltage between said main cathode and said auxiliary cathode, means including A.-C. input means connected between said constricting electrode and said auxiliary cathode to fire said tube periodically, A.-C. output voltage means connected between said anode and said first source, and means coupled between said A.-C. output voltage means and said grid to feed back degeneratively a rectified voltage to said grid from said A.-C. output voltage means, said feedback means comprising a rectifier and a transformer winding connected in series with each other, and means connecting said rectifier and said transformer winding in series with said grid and said main cathode.

2. A regulated inverter for converting D.-C. energy into A.-C. energy comprising a gas tube having an anode, a grid, a main cathode, an auxiliary cathode and a constricting electrode surrounding a portion of said auxiliary cathode, means to apply a first source of D.-C. voltage between said anode and said main cathode, means to apply a second source of D.-C. voltage between said main cathode and said auxiliary cathode, means including A.-C. input means connected between said constricting electrode and said auxiliary cathode to fire said tube periodically, A.-C. output voltage means connected between said anode and said first source, a source of fixed D.-C. voltage, means coupled to said A.-C. output voltage means to rectify a portion of said A.-C. output voltage, means to compare said rectified voltage with said source of fixed D.-C. voltage and to derive an error voltage, and means to apply said error voltage to said grid.

3. A regulated inverter for converting D.-C. energy into A.-C. energy comprising a gas tube having an anode, a grid, a main cathode, an auxiliary cathode and a constricting electrode surrounding a portion of said auxiliary cathode, means to apply a first source of D.-C. voltage between said anode and said main cathode, means to apply a second source of D.-C. voltage between said main cathode and said auxiliary cathode, means including A.-C. input means connected between said constricting electrode and said auxiliary cathode to fire said tube periodically, A.-C. output voltage means connected between said anode and said first source, a source of fixed D.-C. voltage, means coupled to said A.-C. output voltage means to rectify a portion of said A.-C. output voltage, means to compare said rectified voltage with said source of fixed D.-C. voltage and to derive an error voltage, and means to apply said error voltage to said grid, said last-mentioned means comprising a cathode follower tube having a control grid, a cathode and an anode, said control grid being connected to said error voltage deriving means, said cathode of said cathode follower tube being connected to said main cathode of said gas tube, means to apply a source of operating voltage between said anode and said cathode of said cathode follower tube, and a resistor connected between said main cathode and said grid of said gas tube.

4. A regulated inverter comprising a pair of gas tubes each having an anode, a grid, a main cathode, an auxiliary cathode, and a constricting electrode surrounding a portion of said auxiliary cathode, A.-C. output voltage means coupled to said anodes to derive an A.-C. voltage therefrom, means to apply a first source of unidirectional voltage between said anodes and said main cathodes, means to apply a second source of unidirectional voltage between said main cathodes and said auxiliary cathodes, means including A.-C. input means connected between the auxiliary cathode and the constricting electrode of each of said tubes to fire said tubes alternately, and feedback means coupled between said A.-C. output voltage means and the grid of one of said tubes, said feedback means comprising means to rectify a sample of said A.-C. output voltage, and means to apply said rectified sample voltage to said grid of one of said tubes, said last-mentioned means comprising a third source of fixed voltage, and means to control the amplitude of said rectified sample voltage with said third source of fixed voltage.

5. A regulated inverter comprising a pair of gas tubes each having an anode, a grid, a main cathode, an auxiliary cathode, and a constricting electrode surrounding a portion of said auxiliary cathode, A.-C. output voltage means coupled to said anodes to derive an A.-C. voltage therefrom, means to apply a first source of unidirectional voltage between said anodes and said main cathodes, means to apply a second source of unidirectional voltage between said main cathodes and said auxiliary cathodes, means including A.-C. input means connected between the auxiliary cathode and the constricting electrode of each of said tubes to fire said tubes alternately, means coupled to said A.-C. output means to derive an A.-C. sample voltage therefrom, means to rectify said sample voltage, amplifying means having an input coupled to said rectifier whereby to apply said rectified sample voltage thereto, a third source of fixed voltage, said amplifying means comprising means to compare said sample voltage with said third source of fixed voltage and provide an error signal at its output, and means to apply said error signal to a grid of at least one of said gas tubes.

References Cited in the file of this patent
UNITED STATES PATENTS

| | | |
|---|---|---|
| 2,070,446 | Mittag | Feb. 9, 1937 |
| 2,159,827 | Westendorp | May 23, 1939 |
| 2,547,162 | Kidd | Apr. 3, 1951 |
| 2,689,325 | Johnson et al. | Sept. 14, 1954 |
| 2,691,755 | Zirker | Oct. 12, 1954 |